Unitec

Re. 28,363
Reissued Mar. 11, 1975

28,363
TOOTHPASTE

Henning Asche, Bettingen, Switzerland, assignor to Ciba-Geigy AG, Basel, Switzerland No Drawing. Original No. 3,691,272, dated Sept. 12, 1972, Ser. No. 74,528, Sept. 22, 1970, which is a continuation-in-part of abandoned application Ser. No. 6,032, Jan. 23, 1970, which is a continuation of abandoned application Ser. No. 608,736, Jan. 12, 1967. Application for reissue Sept. 10, 1973, Ser. No. 395,518
Int. Cl. A61k *7/16*
U.S. Cl. 424—57 7 Claims

Matter enclosed in heavy brackets [ ] appears in the original patent but forms no part of this reissue specification; matter printed in italics indicates the additions made by reissue.

ABSTRACT OF THE DISCLOSURE

Toothpaste compositions consisting essentially of sodium chloride or marine salt, hydroxy-ethyl or -methyl cellulose, glycerol, a condensation product of ethylene oxide and polyoxypropylene glycol, a polishing agent such as dicalcium phosphate dihydrate, sodium metaphosphate or calcium orthophosphate, colloidally dispersed silica, the sodium salt of saccharine and/or sodium cyclamate, flavorings and water in such proportions as to provide a paste of acceptable taste and consistency.

CROSS REFERENCE

This application is a continuation-in-part of our copending application Ser. No. 6,032 filed Jan. 23, 1970, which application is a streamlined continuation of application Ser. No. 608,736, filed Jan. 12, 1967, both now abandoned.

DETAILED DESCRIPTION

The present invention relates to an improved toothpaste composition containing sodium chloride.

Toothpaste compositions containing a considerable amount of sodium chloride in the form of ordinary salt (NaCl) and/or marine salt, are well-known and have been described in such recent patent literature as U.S. Pat. No. 2,994,642 and Swiss Pat. No. 332,336. Such toothpastes were commercially sold and were especially recommended by the dentists particularly in view of their firming action on the gums. Salt-containing toothpastes were also acclaimed by the public, however, interest was limited more or less to people having been forced to take great care of their gums for reasons of increased sensitivity or because contractions thereof had already occurred. A number of drawbacks of the hitherto known salt-containing toothpastes limited their more general use, which of course would be desirable, particularly with respect to the prophylaxis of gingival diseases. Among such drawbacks are the following: The hitherto known toothpastes containing only water insoluble silicates or colloidal silica as consistency enhancing agents, have a thixotropic gel structure, i.e., the gel is destroyed upon the mechanical stress as applied during brushing teeth, whereby a sol of low viscosity is formed. The feeling in the mouth is as if the paste suddenly disappears. Such pastes also have only little cleaning activity. Furthermore, the salty taste is too strong, so that the flavoring agents used are unable to mask it. As a consequence, there is only a limited feeling of refreshment. Another drawback is the insufficient consistency of the hitherto known salt-contaniing toothpastes. These pastes are either too stiff and hard and in sufficiently flexible, or they have the tendency to separate into liquid and solid bodies. If they are too stiff, they will not adhere to the brush and the teeth.

Attempts to prepare an improved toothpaste composition without such drawbacks and containing a physiologically active amount of sodium chloride on the basis of formulations described in the literature, were unsuccessful. Also, the combination of known ingredients of toothpastes in amounts given in the literature with the essential sodium chloride did not lead to an acceptable paste.

It is the object of the present invention to provide a toothpaste, containing a physiologically active amount of sodium chloride and/or marine salt, which avoids the drawbacks of the hitherto known pastes of this kind, but in its consistency, subjective appeal in the mouth cleaning activity and taste, is more similar to the commonly known toothpastes preferred by the public.

It has now been found that such toothpastes containing a physiologically active amount of sodium chloride and/or marine salt and satisfying above requirements, can be prepared by admixing to a jelly prepared from a concentrated aqueous solution of the desired salt, a moisture retaining agent, a gelling agent capable of gelling in concentrated salt solutions, and of a mildly surface-active substance, a mixture prepared from a polishing agent, unpressed colloidal silica, a sweetener such as saccharine or cyclamate, and the desired flavoring, and homogenizing the thus obtained paste.

More particularly, the toothpaste of the present invention is prepared from

12–17% of a salt selected from the group consisting of sodium chloride and marine salt;
0.5–2.5% of a gelling agent selected from the group consisting of hydroxyethyl cellulose, hydroxymethyl cellulose and mixtures thereof;
1.4–2.5% of colloidally dispersed silica;
5–20% of glycerol;
0.1–1% of a condensation product of ethylene oxide and polyoxypropylene glycol having a molecular weight of about 8700 and consisting of 20 weight percent hydrophobic polyoxypropylene glycol moiety of about 1500–1800 molecular weight and about 80 weight percent polyoxyethylene moiety;
15–35% of a polishing agent selected from the group consisting of dicalcium phosphate dihydrate, calcium ortho-phosphate and sodium metaphosphate, and the mixtures thereof, a sweetener selected from the group consisting of
0.03–0.3% of the sodium salt of saccharine,
0.3–1.5% of sodium cyclamate and
0.4–1.5% of mixtures thereof;
0.1–1.5% of toothpaste flavoring;

and an amount of water such that the total amount of ingredients in said toothpaste composition is 100 percent, all percentages being by weight and based on the total weight of said toothpaste, said sodium chloride being in solution, said gelling agent and said silica being present in an amount such that a homogeneous and pasty consistency is obtained, said condensation product being present in an amount such that one part of said toothpaste diluted in 20 parts of water has a surface tension of about 45 to 60 dynes/cm.

In a preferred embodiment 15 percent of sodium chloride and/or marine salt is used. The physiological effect of salt-containing toothpastes, namely promotion of the firming of the gums, is, based on the osmotic action of concentrated salt solutions. If marine salt is used, advantage is taken of the trace elements occurring therein.

As toothpastes containing soaps or strongly foaming surface active detergents, soften the gums by dissolving important substances out of the cells and, on the other hand, promoting the penetration of dissolved substances, it is of advantage to use only non-foaming surface active substance in the toothpaste of the present invention. Such surface active compounds, additionally having good solubility and cleansing power, are in particular practically low foaming non-ionogenic substances. Useful are the condensates of polyoxypropylene glycol with ethylene oxide as defined before, in amounts of 0.1–1 percent, whereby the surface tension of one part of the toothpaste in 20 parts of water is adjusted to 45–60 dynes/cm. This value roughly corresponds to the range of the surface tension of the saliva (cf. D. Afonsky, "Saliva and Its Relation to Oral Health," University of Alabama Press 1961, page 32) and is physicologically particularly favorable. Advantageously, the surface-active agents used in the present invention have little taste.

The gelling agents hydroxyethyl cellulose and hydroxymethyl cellulose are used because they were found to gel easily in the concentrated aqueous salt solutions. The amounts of 0.5 to 2.5 percent of the gelling agent are critical in combination with the amount of the colloidal silica to be used. The latter agent was already used in the U.S. Pat. No. 2,994,642 in amounts of 7.5 percent and higher. The advantages of colloidal silica are the consistency-enhancing properties and the absorption qualities for toxins. However, if silica alone is used in amounts described in said patent and in combination with the high amount of polishing agents of the present toothpaste, only an extremely stiff paste results which does not adhere to the brush. Furthermore, due to the absorption qualities of the silica, the flavoring of the paste is difficult or even impossible. If the colloidal silica is used in an amount below the one disclosed in the literature, to be more exact below 4 percent, a separation into liquid and solid bodies is observed.

On the other hand, if the gelling agents hydroxyethyl cellulose or hydroxymethyl cellulose of the present toothpaste composition, in even relatively high amounts are used alone, i.e., without colloidal silica, only insufficient consistency is obtained.

It is thus an essential feature of the toothpaste composition according to the present invention that the hydroxyethyl cellulose or the hydroxymethyl cellulose and the colloidal silica are used together and in combination with the concentrated salt solution and the polishing agent in such defined amounts as to provide an acceptable consistency of the final paste.

The total content of the consistency enhancing agents, i.e., the gelling agent and the colloidal silica, should be such that its amounts dispersed in an aqueous solution of glycerol and sodium chloride in the given ratios provides a viscosity in the range of about 8,000 to 24,000 centipoises.

As a measure of the consistency of a paste, its spreadability can be used. The spreadability of the final toothpaste can be determined by conventional methods utilizing an extensometer, whereby the area is measured over which a sample of 3 ml. of the paste between two glass plates at 25° under a weight of 100 g. during 5 minutes spreads out. The values obtained are very suitable to characterize the consistency of pastes. Values of about 12 to 15 $cm.^2$ are considered very good. The values of the toothpastes prepared according to the invention, fulfill the requirements.

The polishing agents used in the toothpaste composition of the invention have not yet been used in other salt-containing pastes. Calcium orthophosphate is particularly useful, however also dicalcium phosphate dihydrate and sodium metaphosphate or mixtures thereof can be used. The amounts vary between 15 and 35 percent, whereby 20 to 30 percent are preferred. Strongly adsorbent abrasives such as calcium carbonate, e.g., in the form of chalk, should be avoided in order to prevent undue adsorption of the flavoring and attacking of teeth and gums.

The slight amounts of the sweeteners saccharine, suitably in form of its sodium salt, and/or sodium cyclamate serve the purpose of masking the unpleasant salty taste to a very great extent. In addition, the effect of the flavorings is increased thereby. In particular, it was surprising and could not have been foreseen, that it would be possible to mask the salty taste of the very large amount of sodium chloride by means of the relatively small amount of sweetener.

As flavorings are used particularly peppermint oil, either alone or in combination with anise oil or other essential oils. The amounts are between about 0.1 and 1.5 percent and depend on the essential oil used and the desired strength of the flavor.

The following examples will serve to further typify the preparation and the composition of the toothpastes of the invention, however, they should not be construed as a limitation of the scope thereof. The percentages throughout this specification and the claims are by weight.

EXAMPLE 1

To a solution of 15.00 g. of marine salt and 0.16 g. of the sodium salt of saccharine in 45.34 g. of water is added 5.00 g. of glycerol and 1.00 g. of hydroxyethyl cellulose (e.g., the commercial product Natrosol 250 MR of Hercules Powder Co., Wilmington, can be used) and the mixture is allowed to gel under stirring. In the jelly thus formed is dissolved 0.50 g. of a water-soluble condensation product of polyoxypropylene glycol and ethylene oxide having a molecular weight of about 8,700 and consisting of 20 weight percent of hydrophobic polyoxypropylene glycol moiety of a molecular weight of about 1,500 to 1,800 and about 80 weight percent of polyoxyethylene moiety (Pluronic F 68). A mixture consisting of 15.00 g. of dicalcium phosphate dihydrate, 15.00 g. of insoluble sodium metaphosphate and 2.50 g. of unpressed colloidal silica (Aerosil) is prepared and then stirred into above jelly, whereby a paste is formed. The paste is flavored with 0.50 g. of toothpaste flavoring (containing peppermint oil as main component) and the whole is well mixed and homogenized.

The toothpaste so obtained has the physiologically favorable pH-value of about 4.5.

The homogenized mixture is of pasty consistency and does not separate into liquid and solid ingredients. The spreadability is of favorable order.

Analogously to Example 1, toothpastes of the following compositions are prepared:

EXAMPLE 2

| | G. |
|---|---|
| Water | 44.12 |
| Marine salt | 15.00 |
| Cyclamate sodium | 1.50 |
| Glycerol | 5.00 |
| Natrosol 250 MR | 1.00 |
| Pluronic F 68 | 0.50 |
| Dicalcium phosphate dihydrate | 15.00 |
| Insoluble sodium metaphosphate | 15.00 |
| Aerosil, unpressed | 2.50 |
| Star anise oil | 01.0 |
| Peppermint oil | 0.28 |

The marine salt is dissolved in water and the other components are added to the filtered solution in order indicated.

EXAMPLE 3

| | G. |
|---|---|
| Water | 44.58 |
| Marine salt | 15.00 |
| Saccharine sodium salt | 0.12 |
| Cyclamate sodium | 0.30 |
| Glycerol | 5.00 |
| Natrosol 250 MR | 1.40 |
| Pluronic F 68 | 0.50 |
| Dicalcium phosphate dihydrate | 5.00 |
| Insoluble sodium metaphosphate | 25.00 |
| Aerosil, unpressed | 2.10 |
| Toothpaste flavoring | 1.00 |

The marine salt and the saccharine sodium salt are dissolved and the other components are then added in the order indicated to the filtered solution.

EXAMPLE 4

| | G. |
|---|---|
| Water | 44.45 |
| Marine salt | 15.00 |
| Saccharine sodium salt | 0.10 |
| Cyclamate sodium | 0.70 |
| Glycerol | 5.00 |
| Natrosol 250 MR | 2.10 |
| Pluronic F 68 | 0.50 |
| Dicalcium phosphate dihydrate | 20.00 |
| Dicalcium phosphate, anhydrous | 10.00 |
| Aerosil, unpressed | 1.40 |
| Toothpaste flavoring | 0.75 |

Here also, the marine salt and the saccharine sodium salt are first dissolved in water and the other components are added afterwards in the order indicated to the filtered solution, respectively, to the paste.

EXAMPLE 5

| | G. |
|---|---|
| Water | 44.70 |
| Marine salt | 15.00 |
| Sodium salt of saccharine | 0.30 |
| Glycerol | 5.00 |
| Natrosol 250 MR | 1.00 |
| Pluronic F 68 | 0.50 |
| Calcium orthophosphate | 30.00 |
| Aerosil, unpressed | 2.50 |
| Toothpaste flavoring | 1.00 |

The components are mixed together according to Example 1.

In all these examples, the marine salt can also be replaced in common salt.

What is claimed is:

1. An aqueous toothpaste composition consisting essentially of:
   - 12–17% of a salt selected from the group consisting of sodium chloride and marine salt;
   - 0.5–2.5% of a gelling agent selected from the group consisting of hydroxyethyl cellulose, hydroxymethyl cellulose and mixtures thereof;
   - 1.4–2.5% of colloidally dispersed silica;
   - 5–20% of glycerol;
   - 0.1–1% of a condensation product of ethylene oxide and polyoxypropylene glycol having a molecular weight of about 8700 and consisting of 20 weight-percent hydrophobic polyoxypropylene glycol moiety of about 1500–1800 molecular weight and about 80 weight-percent polyoxyethylene moiety;
   - 15–35% of a polishing agent selected from the group consisting of dicalcium phosphate dihydrate, calcium orthophosphate and sodium metaphosphate, and mixtures thereof; a sweetener selected from the group consisting of
     - 0.03–0.3% of the sodium salt of saccharine,
     - 0.3–1.5% of sodium cyclamate and
     - 0.4–1.5% of mixtures thereof;
   - 0.1–1.5% of toothpaste flavoring;

and an amount of water such that the total amount of ingredients in said toothpaste composition is 100 percent, all percentages being by weight and based on the total weight of said toothpaste, said sodium chloride being in solution, said gelling agent and said silica being present in an amount such that a homogenous and pasty consistency is obtained, the total amount of said gelling agent and said silica combined being about 3.5 percent by weight of the toothpaste, said condensation product being present in an amount such that one part of said toothpaste diluted in 20 parts of water has a surface tension of about 45 to 60 dynes/cm.

2. A toothpaste composition according to claim 1, consisting essentially of

- 15% of marine salt or sodium chloride;
- 1% of hydroxyethyl cellulose;
- 2.5% of colloidally dispersed silica;
- 5% of glycerol;
- 0.5% of said condensation product of ethylene oxide and polyoxypropylene glycol;
- 15% of dicalcium phosphate dihydrate;
- 15% of sodium metaphosphate;
- 0.16% of sodium salt of saccharine; and an amount of water and flavoring to fill up to 100%.

3. A toothpaste composition according to claim 1, consisting essentially of
   - 15% marine salt or sodium chloride;
   - 1% of hydroxyethyl cellulose;
   - 2.5% of colloidally dispersed silica;
   - 5% of glycerol;
   - 0.5% of said condensation product of ethylene oxide and polyoxypropylene glycol;
   - 30% of calcium orthophosphate;
   - 0.30% of sodium salt of saccharine; and an amount of water and flavoring to fill up to 100%.

4. A toothpaste composition according to claim 1, consisting essentially of
   - 15% marine salt or sodium chloride;
   - 1% of hydroxyethyl cellulose;
   - 2.5% of colloidally dispersed silica;
   - 5% of glycerol;
   - 0.5% of said condensation product of ethylene oxide and polyoxypropylene glycol;
   - 15% of dicalcium phosphate dihydrate;
   - 15% of sodium metaphosphate;
   - 1.5% of sodium cylamate; and an amount of water and flavoring to fill up to 100%.

5. A toothpaste according to claim 1, consisting essentially of:
   - 15% marine salt or sodium chloride;
   - 1.4% of hydroxyethyl cellulose;
   - 2.1% of colloidally dispersed silica;
   - 5% of glycerol;
   - 0.5% of said condensation product of ethylene oxide and polyoxypropylene glycol;
   - 5% of dicalcium phosphate dihydrate;
   - 25% of sodium metaphosphate;
   - 0.3% of sodium cyclamate;
   - 0.12% of sodium of saccharine; and an amount of water and flavoring to fill.

6. A toothpaste according to claim 1, consisting essentially of
   - 15% marine salt or sodium chloride;
   - 2.1% of hydroxyethyl cellulose;
   - 1.4% of colloidally dispersed silica;
   - 0.5% of said condensation product of ethylene oxide and polyoxypropylene glycol;
   - 20% of dicalcium phosphate dihydrate;
   - 10% of dicalcium phosphate anhydrous;
   - 0.1% of sodium salt of saccharine;
   - 0.7% of sodium cyclamate; and an amount of water and flavoring to fill up to 100%.

*7. An aqueous toothpaste composition consisting essentially of:*
   - *12–17% of a salt selected from the group consisting of sodium chloride and marine salt;*
   - *0.5–2.5% of a gelling agent selected from the group consisting of hydroxyethyl cellulose, hydroxymethyl cellulose and mixtures thereof;*
   - *1.4–2.5% of colloidally dispersed silica;*
   - *5–20% of glycerol;*
   - *.01–1% of a condensation product of ethylene oxide and polyoxypropylene glycol having a molecular weight of about 8700 and consisting of 20 weight percent hydrophobic polyoxypropylene glycol moiety of about 1500–1800 molecular weight and about 80 weight percent polyoxyethylene moiety;*
   - *15–35% of a polishing agent selected from the group consisting of dicalcium phosphate dihydrate, calcium*

*orthophosphate and sodium metaphosphate and mixtures thereof, a sweetener, toothpaste flavoring, and an amount of water such that the total amount of ingredients in said toothpaste composition is 100 percent, all percentages being by weight and based on the total weight of said toothpaste, said sodium chloride being in solution, said gelling agent and said silica being present in an amount such that a homogenous and pasty consistency is obtained, the total amount of said gelling agent and said silica combined being about 3.5 percent by weight of the toothpaste, said condensation product being present in an amount such that one part of said toothpaste diluted in 20 parts of water has a surface tension of about 45 to 60 dynes/cm.*

References Cited

The following references, cited by the Examiner, are of record in the patented file of this patent or the original patent.

UNITED STATES PATENTS

| | | | |
|---|---|---|---|
| 2,773,801 | 12/1956 | Fox | 424—57 |
| 2,994,642 | 8/1961 | Bossard | 424—49 |
| 3,122,483 | 2/1964 | Rosenthal | 424—54 |

OTHER REFERENCES

Accepted Dental Remedies, 29th ed., published by American Dental Assoc., Chicago, 1963, p. 179.

RICHARD L. HUFF, Primary Examiner